United States Patent
Calinski (10) Patent No.: US 8,033,250 B2
(45) Date of Patent: Oct. 11, 2011

(54) MARINE HABITAT SYSTEMS

(75) Inventor: Michael D. Calinski, Captiva Island, FL (US)

(73) Assignee: Ocean Restoration Corporation & Associates, Captiva Island, FL (US)

( * ) Notice: Subject to any disclaimer, the term of this patent is extended or adjusted under 35 U.S.C. 154(b) by 211 days.

(21) Appl. No.: 12/433,132

(22) Filed: Apr. 30, 2009

(65) Prior Publication Data

US 2009/0320766 A1 Dec. 31, 2009

Related U.S. Application Data

(60) Provisional application No. 61/049,163, filed on Apr. 30, 2008.

(51) Int. Cl.
*A01K 61/00* (2006.01)
(52) U.S. Cl. .................. 119/208; 119/223; 119/240
(58) Field of Classification Search .......... 119/221, 119/204, 207, 208, 200, 209, 238–244, 222, 119/210, 223, 234–236; 405/23, 26, 27; 210/242.1
See application file for complete search history.

(56) References Cited

U.S. PATENT DOCUMENTS

| | | | | |
|---|---|---|---|---|
| 2,989,945 A * | 6/1961 | Ford | | 119/240 |
| 3,316,881 A | 5/1967 | Fischer | | |
| 3,675,626 A * | 7/1972 | Down | | 119/238 |
| 3,702,599 A * | 11/1972 | Herolzer | | 119/241 |
| 3,741,159 A * | 6/1973 | Halaunbrenner | | 119/240 |
| 3,824,957 A | 7/1974 | Halaunbrenner | | |
| 3,841,266 A * | 10/1974 | Hoshino | | 119/208 |
| 3,853,095 A * | 12/1974 | Lawrence | | 119/238 |
| 3,870,019 A * | 3/1975 | McNicol | | 119/241 |
| 4,231,322 A | 11/1980 | Gilpatric | | |
| 4,266,509 A | 5/1981 | Gollott et al. | | |
| 4,377,987 A * | 3/1983 | Satre | | 119/241 |
| 4,395,970 A | 8/1983 | Kunkle et al. | | |
| 4,766,846 A * | 8/1988 | Lavoie | | 119/240 |
| 4,993,362 A | 2/1991 | Jimbo | | |
| 5,007,377 A | 4/1991 | Muench, Jr. | | |
| 5,213,058 A * | 5/1993 | Parker et al. | | 119/208 |
| 5,785,002 A * | 7/1998 | Cazin | | 119/223 |
| 6,044,798 A * | 4/2000 | Foster et al. | | 119/240 |
| 6,089,191 A | 7/2000 | Calinski et al. | | |
| 6,520,116 B1 * | 2/2003 | Jefferds | | 119/238 |
| 7,827,937 B1 * | 11/2010 | Walter | | 119/221 |
| 2003/0111020 A1 * | 6/2003 | Targotay et al. | | 119/200 |
| 2006/0112895 A1 * | 6/2006 | Olivier et al. | | 119/200 |
| 2008/0223304 A1 * | 9/2008 | Froyland | | 119/209 |

OTHER PUBLICATIONS

Calinski; "Good News for Troubled Waters: A Revolutionary Breakthrough in Ecological Engineering."; Ocean Restoration Corporation & Associates; 2007; 28 pages.

* cited by examiner

*Primary Examiner* — Rob Swiatek
*Assistant Examiner* — Kristen Hayes
(74) *Attorney, Agent, or Firm* — St. Onge Steward Johnston & Reens LLC (57) ABSTRACT

A marine habitat system comprising one or more assembled units, each formed of a flotation element and a plurality of habitat tiers fixed to and spaced below the flotation element. The habitat tiers are comprised of frame assemblies formed of upper and lower open frame elements and side walls, forming a space. The space is filled with a mesh matrix of plastic fibers which forms an ideal environment in which various desirable juvenile marine creatures (crabs, lobsters, oysters, etc.) can thrive. Upwardly projecting, simulated prop roots can be provided on the habitat tiers to provide additional anchorage area for marine life to attach.

6 Claims, 9 Drawing Sheets

MARINE HABITAT SYSTEMS

CROSS-REFERENCE TO RELATED APPLICATIONS

The present application claims the benefit under 35 U.S.C. §119(e) of the U.S. Provisional Patent Application Ser. No. 61/049,163, filed on Apr. 30, 2008. This invention is also related to the invention described in the Calinski et al. U.S. Pat. No. 6,089,191, granted Jul. 18, 2002, the entire content of which is incorporated herein by reference.

FIELD OF THE INVENTION

The present invention relates to marine habitats which, when installed in coastal tide waters, provide a desirable environment for the breeding and development of various juvenile marine live, such as crabs, lobsters, oysters and the like and which also provide a cleansing action by various filter-feeder organisms which are attracted to the habitat.

BACKGROUND OF THE INVENTION

Marine habitats are, in general, well known, and a wide variety of such habitats has been suggested. However, known habitats suffer from various shortcomings, such as being too complicated and expensive, functionally ineffective and/or unable to withstand the rigorous marine environment to which they are exposed.

SUMMARY OF THE INVENTION

The present invention is directed to a new form of marine habitat that operates generally in the same ecological manner as that of the above mentioned '191 patent, but has numerous improvements, among which are the following:

1. The new habitat can be assembled in novel ways into a one-piece solid unit with no flexible or moving parts such that it will have a reasonable lifespan in the marine environment of as much as 250 years.
2. The new habitat is engineered to withstand direct hurricane impacts.
3. The new habitat is engineered with habitat-to-habitat connectors so that numerous habitats can be assembled into rafts.
4. The new habitat is provided with variable size tier-to-tier stanchion connectors that enable a large number of variations in assembled habitat design for site-specific and species-specific applications, and enables the creation of a high biological diversity at any given site.
5. The new habitat has simulated "prop roots" that better mimic the physical and ecological function of natural mangrove prop roots.
6. The new habitat can easily be designed with a given amount of surface area and structure such that when assembled with varying size stanchions, it provides in an ideal surface-area-to-volume (SAV) ratio ranging between 8.7:1 and 11.2:1.
7. The new habitat incorporates a stiff 3-dimensional webbing, marketed under the trademark EcoMesh, that is uniquely useful for supporting very large numbers of microbes and other small detrivores like marine worms and amphipods, such that these organisms can more efficiently consume and process large amounts of fecal material produced by the filter-feeding organisms that attach elsewhere to the habitat.
8. The new habitat incorporates EcoMesh material that can be manufactured with a variety of denier threads and a variety of densities, resulting in optimized SAV ratios ranging form 10:1 to 26:1, depending on site-specific and species-specific needs.
9. The new habitat incorporates EcoMesh material that has a further function of providing needed hiding places for very young (2 to 10 millimeter) stone and other crabs, in addition to very young lobsters.
10. The new habitat incorporates EcoMesh materials that have a further function of providing the right size prey organisms (detritivores) for developing crabs and lobsters.
11. The new habitat incorporates a virtually indestructible plastic float that will last ten or more times the typical life span of styrene floats previously used, and uses methods of attaching the float to the habitat proper such that the float can be easily changed out when it gets old.

BRIEF DESCRIPTION OF THE DRAWINGS

The invention may be better understood by reference to the following drawings, in which.

DETAILED DESCRIPTION OF THE INVENTION

With references to the drawings, a typical and preferred form of the new habitat includes a hollow (typically blow molded) floatation unit 30 which provides sufficient buoyancy to support a plurality of habitat tiers 31. In the illustrated example there are four such tiers. The entire unit can be formed of a suitable plastic material, such as high density polyethylene (HDPE), which also can be recycled material.

Figure 4:
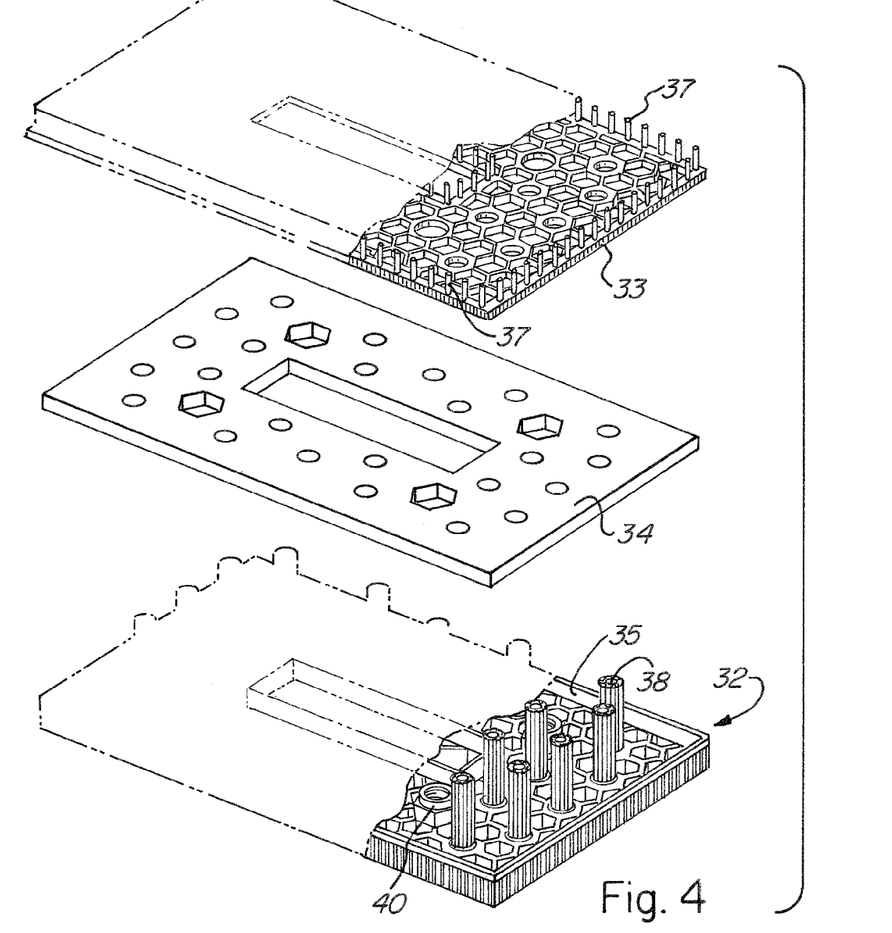
FIG. 4 is an exploded view, in perspective, showing the principal elements of an individual tier of the habitat unit of FIG. 1, with repetitive portions thereof shown in broken lines.
Figure 5:
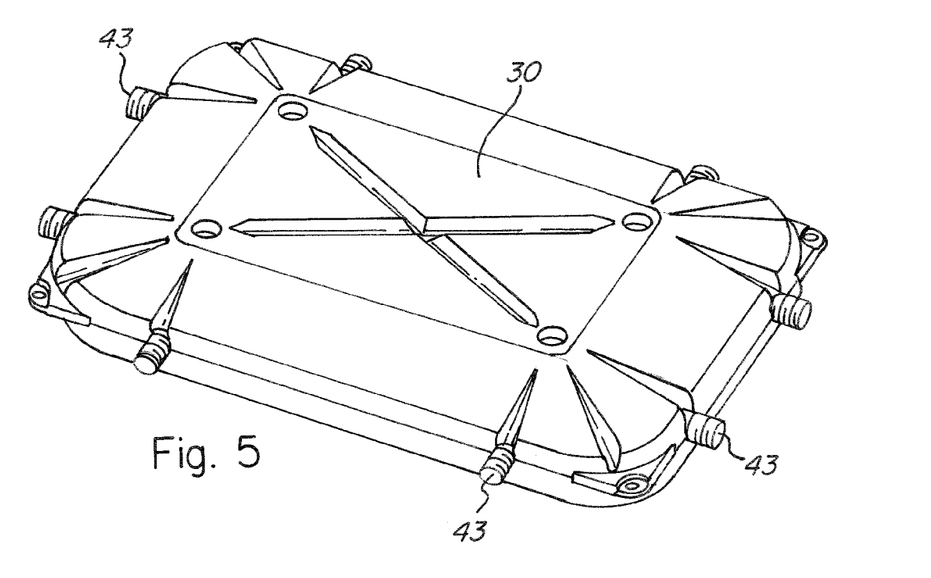
FIG. 5 is a perspective view illustrating features of a float incorporated in the habitat unit of FIG. 1, showing the underside of the float.
Figure 8:
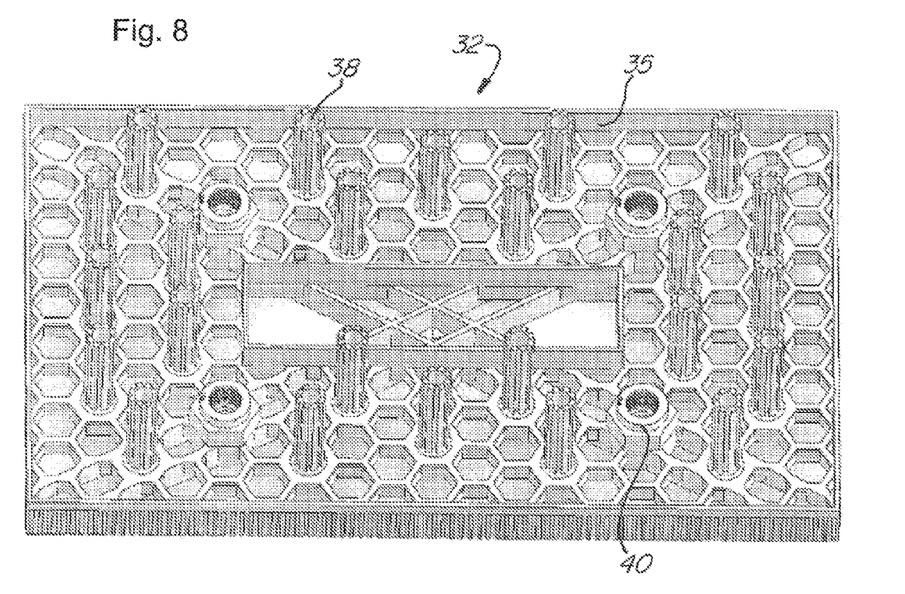
FIGS. 8 and 9 are top and bottom views respectively of the lower frame element of the tier shown in FIG. 4.
Figure 9:
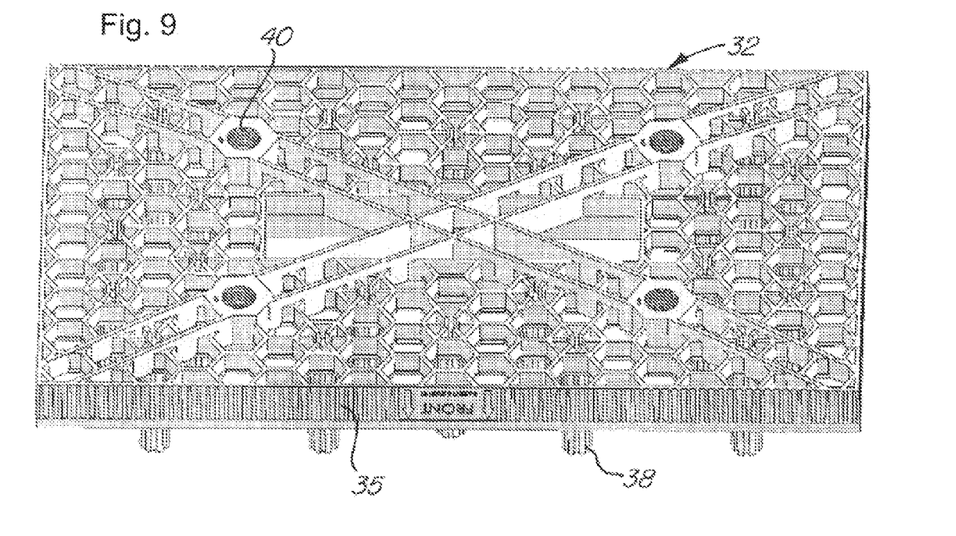
Figure 10:
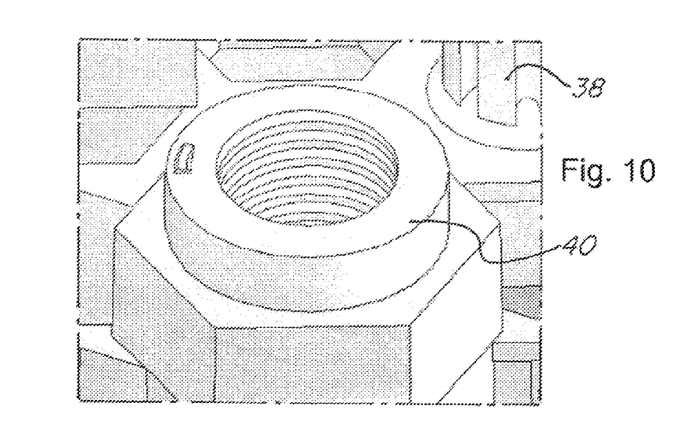
FIGS. 10 and 11 are enlarged, fragmentary views of portions of FIGS. 8 and 9 respectively, illustrating features of threaded sockets formed therein for the reception of spacing stanchions.
Figure 11:
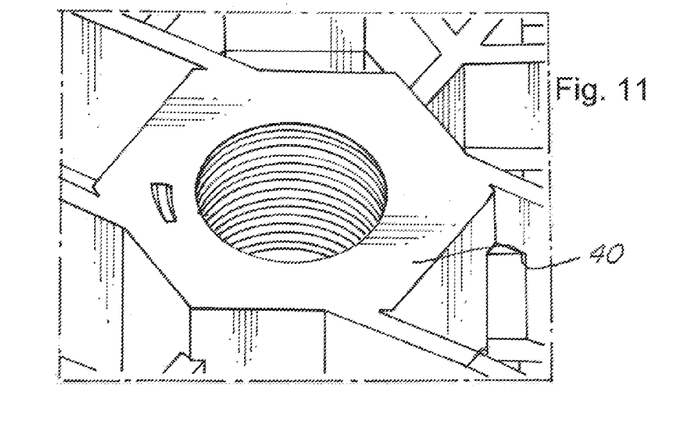
Figure 12:
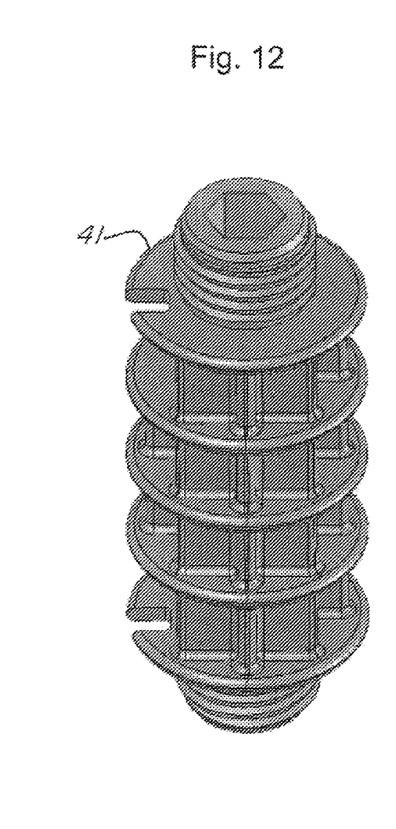
FIG. 12 is a perspective view of a typical spacing stanchion incorporated in the habitat unit of FIG. 1, to secure multiple tiers in rigidly assembled, accurately spaced relation.
Figure 13:
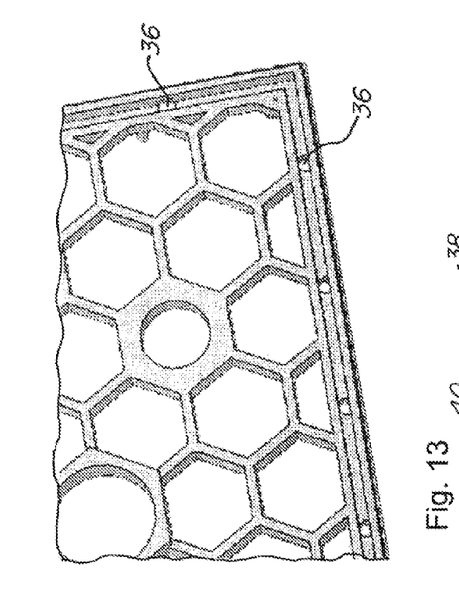
FIG. 13 is a fragmentary perspective view of the underside of a top frame section or cover of one of the habitat tiers shown in FIG. 4.

The individual habitat tiers, shown in exploded view in FIG. 4, comprise a frame having a bottom section 32 having surrounding side walls 35, a cover section 33, and an intermediate layer 34 of a mesh matrix of plastic fibers. As shown in FIGS. 4, 8 and 90, the frame sections 32, 33 are formed with multiple openings to accommodate the free flow of water. Preferably, the mesh material is a commercially available material known as EcoMesh, marketed by Americo, of Atlanta, Ga. and uniquely adapted to the purposes of this invention. The EcoMesh material is a stiff open mesh material, which may be two inches or so in thickness, and is received within the walls 35 of the bottom section of the tier assembly. The EcoMesh is held in place by the cover 33.

The EcoMesh is received within side walls 35 of the lower tier frame section 32. The cover section 33 is engaged to the lower section 32 in part by openings 36 in the cover that engage snap fastener elements on the lower section 32. In the illustration, the tier sections 32, 33 and the EcoMesh section 34 are formed with central cutouts allowing free flow of water through the central area of the tier. Both the outer perimeter and the inner perimeter of the cover section 33 are formed with closely spaced projections 37 forming an oyster fence. This facilitates transplanting of oysters onto the habitat tiers to facilitate and accelerate initial population of the habitat.

The density of the EcoMesh is carefully chosen to provide an appropriate habitat area for microbes and other detrivores, such as worms and amphipods, while also serving to receive and retain the fecal material produced by filter feeding organisms such as sea squirts, muscles and oysters attached to overlying portions of the habitat. The EcoMesh can also serve an important function as a suitable hiding place for young stone crabs and other crabs, as well as young lobsters, enabling these juvenile species to reach a size where there rate of survival is greatly increased as compared to natural conditions.

Each of the tier bottom tier sections 32 is formed with a substantial plurality of upwardly projecting simulated prop roots 38, which pass through correspondingly located openings in the EcoMesh material 34 and in the cover 33. As shown in FIGS. 4, 8 and 9, the simulated prop roots 38, are of a generally cylindrical configuration and are deeply fluted in a vertical (axial) direction to increase surface area. The prop roots project upward through the mesh material and well above the level of the tier cover 33. These simulated prop roots provide excellent anchorage areas for the marine life that will attach to the habitat.

Figure 14:
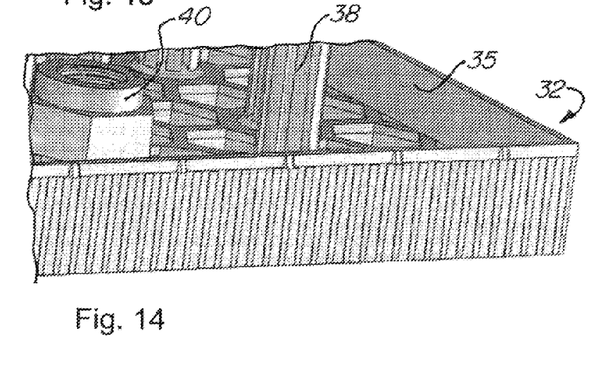
FIG. 14 is an enlarged, fragmentary view of an area of the lower frame section of the habitat tier showing male snap-lock tabs engageable with snap-lock openings in the upper or cover frame section for assembling and securing the two frame sections.
Figure 15:
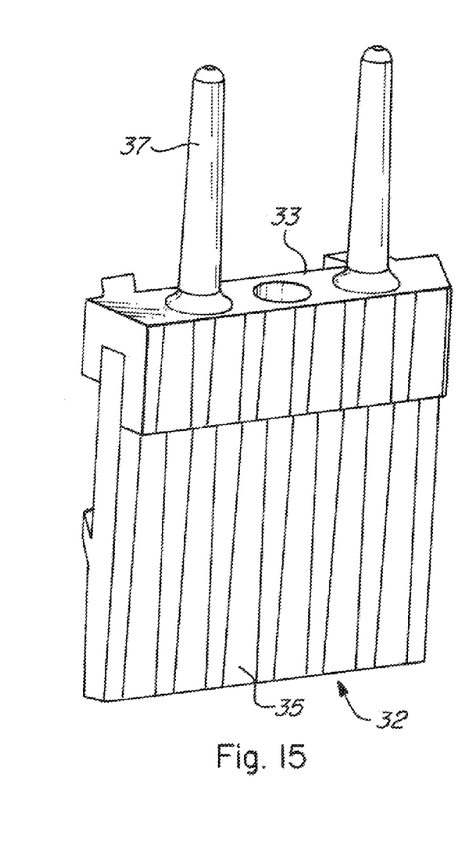
FIG. 15 is a fragmentary view showing the cover section positioned on the bottom frame section and illustrating upwardly projecting elements extending around the periphery of each habitat tier and forming an oyster fence.

The lower sections 32 of each of the tiers are provided with threaded bushings 40 which extend for the full height of the lower sections and are formed with oppositely directed threaded portions above and below. These threaded bushings cooperate with connecting stanchions 41 (FIG. 14). The stanchions 41 are provided at one end with left hand threads and at the opposite end with right hand threads. Thus, the stanchions can be positioned between two vertically separated tiers and simultaneously screwed into the lower openings in the upper tier and the upper openings in the lower tier to rigidly lock the two tiers together. Desirably, there are detent notches at the ends of the stanchions that engage locking tabs on the bushings to maintain the stanchions against rotation, once assembled. End flanges on the stanchions also serve to secure the tier frame covers 33 to the lower frame sections 32.

The stanchions 41 advantageously may be made in a range of lengths, typically four inches, five inches and six inches, for different spacing of the habitat tiers as may be suggested by the particular site in which the habitats are to be installed, and the specific species expected and/or to be encouraged.

Figure 1:
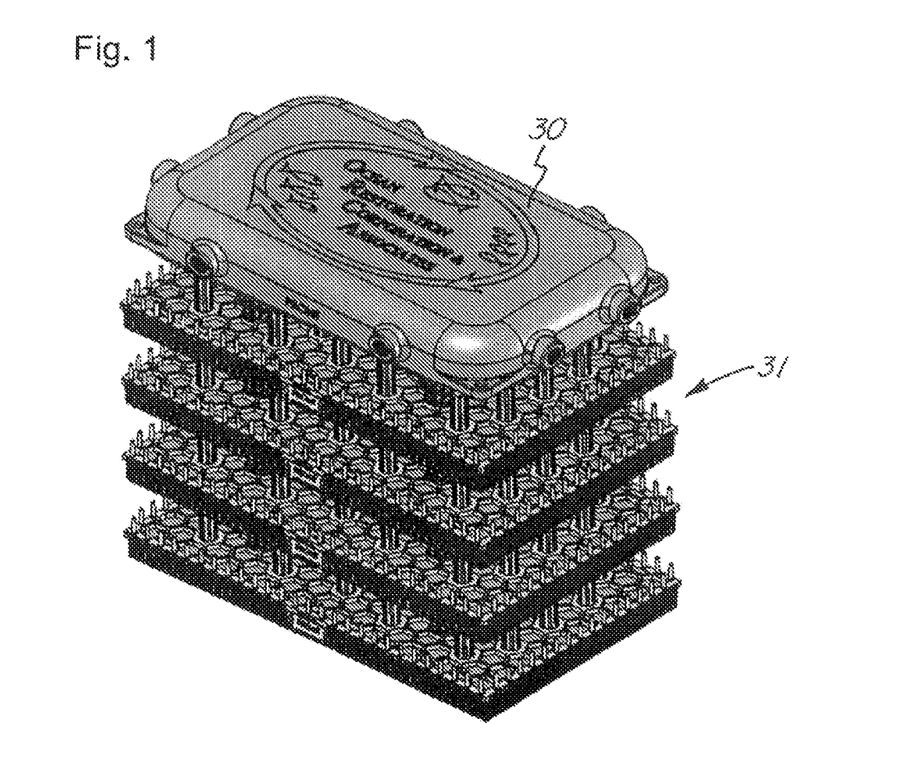
FIG. 1 is a perspective view of an assembled habitat unit incorporating features of the present invention.
Figure 2:
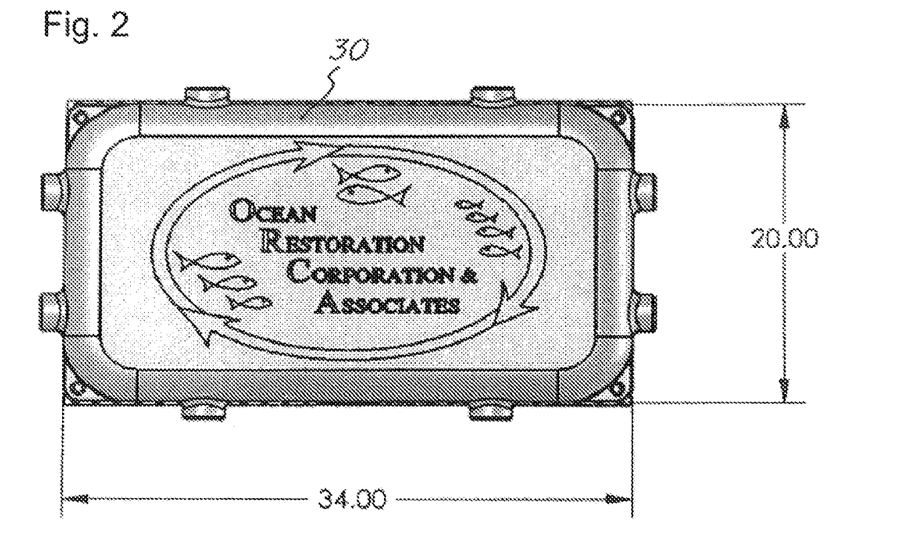
FIG. 2 is a top plan view of the habitat unit of FIG. 1.
Figure 3:
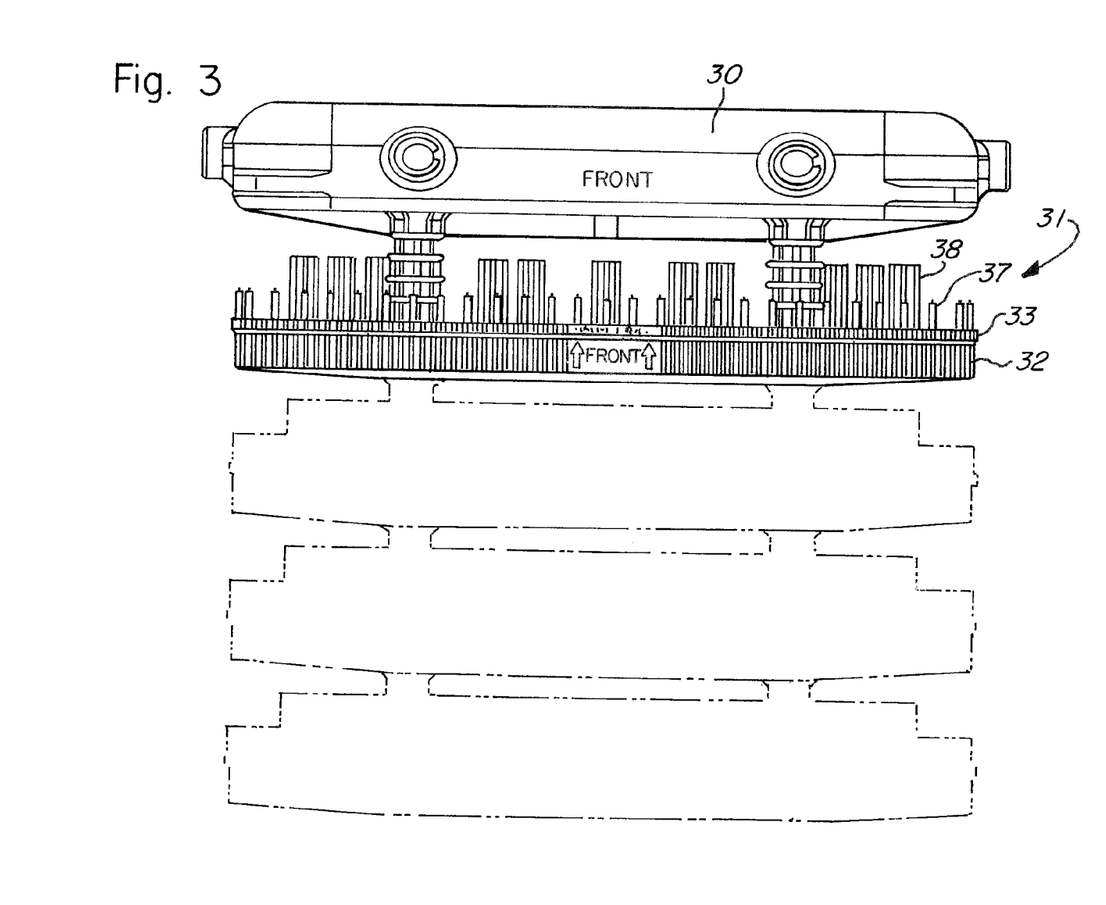
FIG. 3 is an enlarged side elevational view of the habitat unit, with repetitive portions shown in broken lines.
Figure 6:
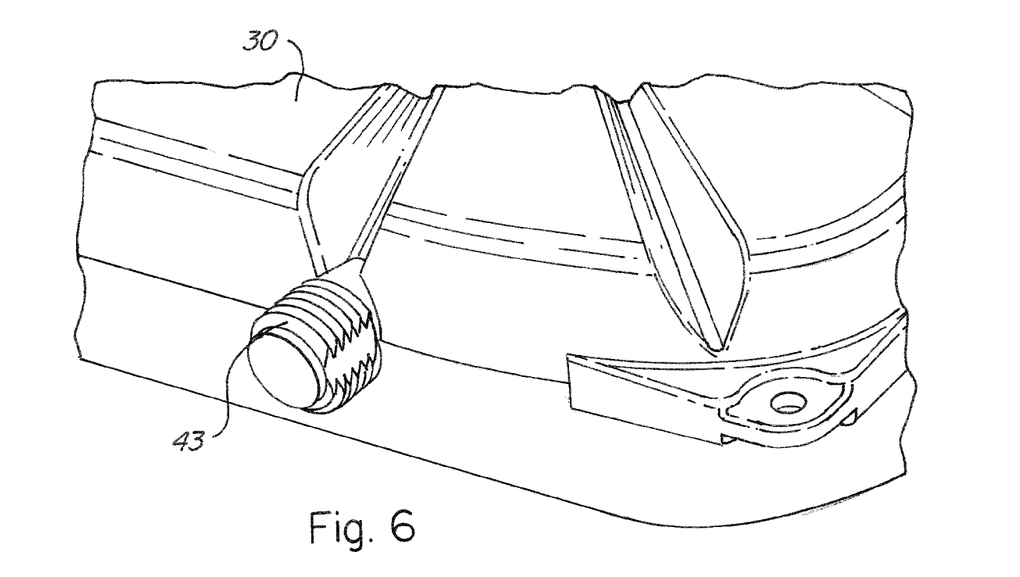
FIG. 6 is an enlarged detail of the perspective view of FIG. 5 illustrating features at a corner area of the float.
Figure 7:
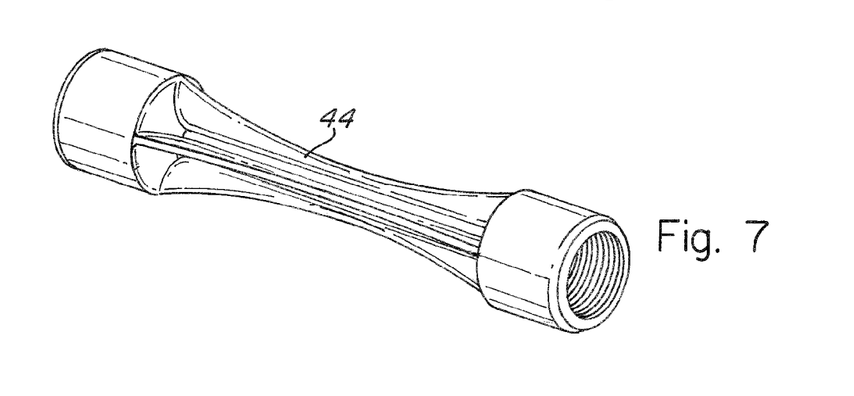
FIG. 7 is a perspective view of a structural connector element for attaching a pair of floats in side-by-side or end-to-end connected arrangement.
Figure 16:
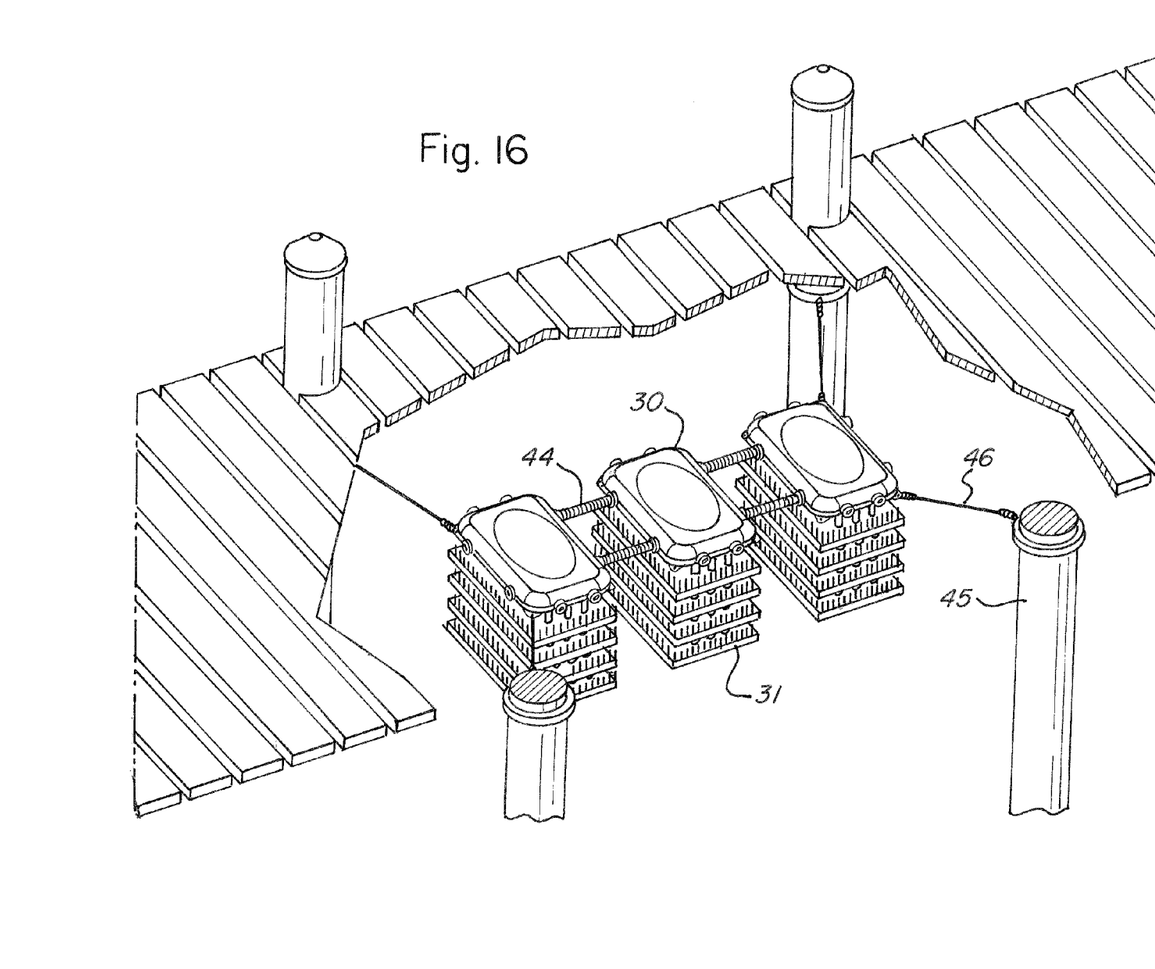
FIG. 16 is a perspective view illustrating showing three habitat units connected together to form a three-unit set, positioned underneath a dock by attachment to pilings thereof.
Figure 17:
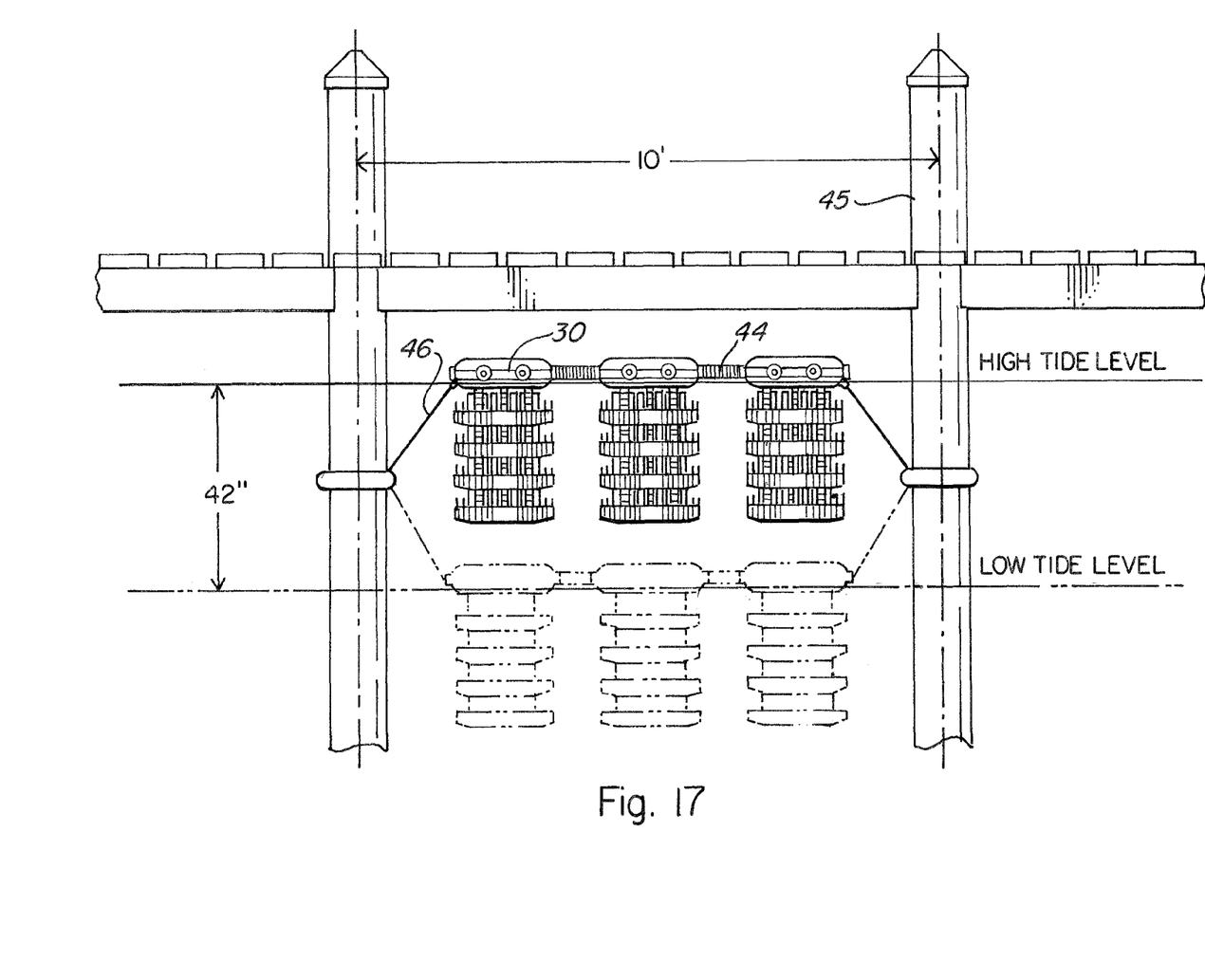
FIG. 17 is an elevational view showing the installation of FIG. 16 and the manner of attachment to dock pilings to accommodate the rise and fall of tidal waters.

The floatation unit 30 is of hollow construction, suitable to provide full buoyancy for the several tiers secured thereto. Where desired, a plurality of the individual units, as shown in FIG. 1, may be connected together in a side-by-side or end-to-end array, as shown for example in FIG. 16. For this purpose, the floats are formed with threaded nipples 43 (FIG. 6), two on each side and two on each end. The nipples 43 are engageable with connectors 44 (FIG. 7). The nipples and connectors are also formed with sets of oppositely oriented threads, so that rotation of the connectors in one direction can serve to join and secure a pair of adjacent floats. The nipples 43 and connectors 44 are provided with snap lock detents (not shown) to prevent loosening of the connectors after installation The habitats of the invention are preferably mounted underneath docks, where they may be suitably anchored to dock pilings and allowed to rise and fall with the tidal flows. A preferred arrangement is shown in FIGS. 16-17, which illustrates a four corner attachment of a habitat set to pilings 45, by means of lines 46 attached to the pilings at levels between the high and low tide heights, enabling the habitat set to rise and fall as shown in FIG. 17. The habitats thus are free to move both up and down and, at mid-tide ranges, laterally as well, but at all times being maintained in the water and off of the sea bottom underneath.

It should be understood, of course, that the specific forms of the invention herein illustrated and described are intended to be representative only of the invention, as various modifications may be made thereto without departing from the clear teachings of the disclosure.

What is claimed is:
1. A marine habitat, especially for tidal shoreline areas and of the type which comprises
 (a) A hollow flotation element formed of plastic material,
 (b) a plurality of habitat tier units positioned in layers below the flotation unit,
 (c) an uppermost one of said habitat tier units being spaced a predetermined distance below said flotation unit, and
 (d) respective lower habitat tier units each being spaced a predetermined distance below a tier unit next above it, characterized by
 (e) each of said habitat tier units comprising a frame structure formed of spaced apart, horizontally disposed upper and lower frame sections formed with multiple openings for the free flow of water,
 (f) side walls formed on at least one of said upper and lower frame sections and extending peripherally around edges of said frame structure to define, together with said upper and lower frame sections, a confined internal space,
 (g) an open mesh matrix material comprised of plastic fibers, formed generally in a configuration corresponding to a configuration of said frame structure, confined in and substantially filling said confined internal space defined by said frame structure,
 (h) said mesh matrix material having a surface-area-to-volume ratio in a range of from 10 to 1 to 26 to 1.

2. The marine habitat of claim 1 wherein (a) said habitat tier units and said flotation unit are provided with vertically oriented, oppositely threaded bushings, and (b) fixed length connecting stanchions, of a length corresponding to spacing between vertically adjacent units, are provided at their respective opposite ends with threads of opposite hand, whereby said stanchions may be connected to bushings in a pair of vertically adjacent units for rigidly joining said vertically adjacent units in said predetermined spaced relation, whereby said habitat tier units are rigidly positioned with respect to a tier unit or floatation unit directly above independently of other units of the habitat.

3. The marine habitat of claim 2, wherein (a) said stanchions have an effective length of about 4 to 6 inches, whereby the spacing of said habitat tier units may be optimized to the marine life expected to be cultivated.

4. The marine habitat of claim 1, wherein (a) at least certain of said habitat tier units are provided with a substantial plurality of generally cylindrically shaped, vertically upwardly projecting simulated prop roots, and (b) said simulated prop roots are formed with deep, vertically extending flutes spaced around the surface thereof to facilitate anchorage of marine life.

5. The marine habitat of claim 4, wherein (a) said simulated prop roots are mounted in the lower frame section of a habitat tier unit and extend upwardly, through the mesh matrix material thereof and through the upper frame section thereof.

6. The marine habitat of claim 1, wherein (a) upper perimeter regions of said habitat tier units are provided with closely spaced elements projecting upwardly above the upper frame sections thereof and forming oyster fences.

\* \* \* \* \*